D. & J. SMITH.
SPEED REGULATING OR REDUCING GEAR.
APPLICATION FILED NOV. 12, 1914.

1,295,807.

Patented Feb. 25, 1919.

Witnesses—

Inventors—
Daniel Smith,
James Smith.
by their Attorneys

UNITED STATES PATENT OFFICE.

DANIEL SMITH AND JAMES SMITH, OF GLASGOW, SCOTLAND.

SPEED REGULATING OR REDUCING GEAR.

1,295,807.  Specification of Letters Patent.  Patented Feb. 25, 1919.

Application filed November 12, 1914. Serial No. 871,771.

*To all whom it may concern:*

Be it known that we, DANIEL SMITH and JAMES SMITH, subjects of the King of Great Britain and Ireland and the Isle of Man, and residents of Glasgow, Scotland, have invented new and useful Improvements in Speed Regulating or Reducing Gears, of which the following is a specification.

This invention has reference to and comprises improvements in speed regulating or reducing gear according to which the speed of a driven shaft may be regulated to any degree within the compass provided for by the gear, which will be applicable to many different purposes.

Figure 1:
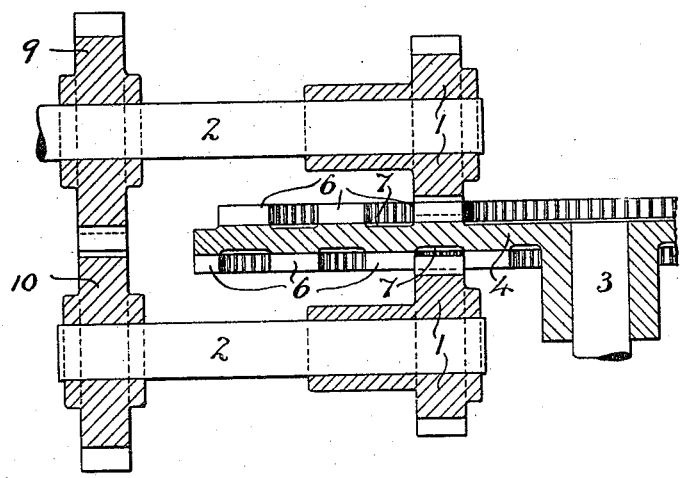
Figure 2:
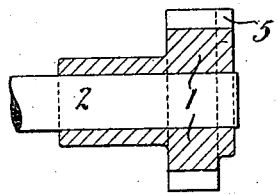

In order that others skilled in the art may properly understand our invention and the manner of carrying same into effect or practice, we have hereunto appended one sheet of illustrative drawings, in which, Figure 1 is a sectional view of a gear constructed in accordance with our invention; and Fig. 2 is a sectional view illustrating a modified form of the pinion.

Referring to these drawings:—

In carrying this invention into effect or practice pinions 1 are fitted to be moved and held in position, by any suitable known means on two parallel driving shafts 2 respectively which are operatively connected by a pair of coacting gears 9 and 10.

Each pinion is formed with teeth of the arranged pitch, and a certain number of the teeth, 5 as shown by Fig. 2, it may be every fifth tooth or as may be arranged to suit the particular gear, are formed longer than the others, but this arrangement is not essential in all cases.

The shaft 3 to be driven, has secured on its ends a wheel or disk 4 on each face of which is cut a series of teeth approximately as a volute or spiral 6 curving from the outer edge of the wheel toward its center, a plain part 7 of equal width throughout being formed between the curves of the series of teeth. The teeth are cut to a pitch to agree with the teeth of the pinion and are radial to the center of revolution of the disk, although the spiral consists of semicircles drawn from points situated alternately on opposite sides of the center of the revolution.

The speed of the driven wheel 4 is regulated by moving the driving pinions 1 nearer to or farther from the center of said wheel, and the whole is so arranged that the pinions are never wholly out of gear with some part of the volute series of teeth 6, the spiral of the teeth on one side of the disk preferably coinciding in position with the blank spaces on the other side.

Either the pinions 1 or the wheel 4 may be the driving member according to the result desired.

What we claim as our invention and desire to secure by Letters Patent is:—

1. A speed regulating or reducing gear comprising a shaft; a disk thereon having two series of teeth respectively projecting from its opposite faces, the teeth of each series being arranged in a spiral line; two operatively connected shafts substantially at right angles to the first shaft; and pinions respectively slidable on said latter shafts radially of the disk and respectively engaging the two sets of teeth thereon.

2. A speed regulating or reducing gear comprising a shaft; a disk on said shaft formed with two sets of teeth on its opposite faces and arranged in spiral lines respectively, the lines of said teeth being radial to the center of revolution of the disk; two operatively connected shafts; with pinions respectively mounted on said latter shafts with their teeth slidably engaging the sets of teeth of the disk and free to be adjusted substantially radially of the disk.

In testimony whereof, we have signed our names to this specification, in the presence of two subscribing witnesses.

DANIEL SMITH.
JAMES SMITH.

Witnesses:
R. C. THOMSON,
JOHN STEWART.